(12) United States Patent
Yoshimura et al.

(10) Patent No.: US 10,947,342 B2
(45) Date of Patent: *Mar. 16, 2021

(54) OPTICAL LENS

(71) Applicant: MITSUBISHI GAS CHEMICAL COMPANY, INC., Tokyo (JP)

(72) Inventors: Yasuaki Yoshimura, Kanagawa (JP); Eiichi Honda, Kanagawa (JP); Keita Noguchi, Kanagawa (JP); Yuichiro Satake, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 16/337,077

(22) PCT Filed: Sep. 27, 2017

(86) PCT No.: PCT/JP2017/035074
§ 371 (c)(1),
(2) Date: Mar. 27, 2019

(87) PCT Pub. No.: WO2018/062327
PCT Pub. Date: Apr. 5, 2018

(65) Prior Publication Data
US 2020/0031990 A1 Jan. 30, 2020

(30) Foreign Application Priority Data
Sep. 28, 2016 (JP) .............................. JP2016-190299

(51) Int. Cl.
| | | |
|---|---|---|
| *C08G 63/199* | (2006.01) | |
| *C08G 63/06* | (2006.01) | |
| *C08L 67/02* | (2006.01) | |
| *G02B 1/04* | (2006.01) | |
| *G02B 3/04* | (2006.01) | |
| *H04N 5/225* | (2006.01) | |

(52) U.S. Cl.
CPC .......... *C08G 63/199* (2013.01); *C08G 63/06* (2013.01); *C08L 67/025* (2013.01); *G02B 1/041* (2013.01); *G02B 3/04* (2013.01); *C08L 2201/10* (2013.01); *H04N 5/2254* (2013.01)

(58) Field of Classification Search
CPC ...... C08G 63/00; C08G 63/06; C08G 63/199; C08L 2201/10; C08L 67/025; G02B 1/04; G02B 1/041; G02B 3/04; H04N 5/2254
See application file for complete search history.

(56) References Cited

U.S. PATENT DOCUMENTS

| | | | | |
|---|---|---|---|---|
| 2012/0301676 | A1* | 11/2012 | Ushida | G02B 1/14 428/148 |
| 2013/0280554 | A1* | 10/2013 | Yamazaki | H01B 5/14 428/697 |
| 2013/0321934 | A1 | 12/2013 | Minezaki et al. | |
| 2015/0158259 | A1 | 6/2015 | Yamamoto et al. | |
| 2017/0044311 | A1 | 2/2017 | Kato et al. | |
| 2017/0276837 | A1 | 9/2017 | Kato et al. | |

FOREIGN PATENT DOCUMENTS

| | | | |
|---|---|---|---|
| JP | 2007161917 | * | 6/2007 |
| JP | 2007-168310 | | 7/2007 |
| JP | WO2012035874 | * | 3/2012 |
| JP | 2012-214568 | | 11/2012 |
| JP | 2013-160994 | | 8/2013 |
| JP | 5849967 | | 12/2015 |
| WO | 2012/035874 | | 3/2012 |
| WO | 2015/163323 | | 10/2015 |
| WO | 2016/052370 | A | 4/2016 |

OTHER PUBLICATIONS

Denis E. Ryono et al., "Electrostatic Facilitation of General Acid Catalyzed a-Oxonium Ion Formation in a Lysozyme-Like Environment Synthesis of the Models", Journal of the American Chemical Society, 98 (7), May 21, 1975, pp. 1889-1899.

Official Communication issued in International Application No. PCT/JP2017/035074, dated Jan. 9, 2018.

* cited by examiner

*Primary Examiner* — Ling Siu Choi
*Assistant Examiner* — Gennadiy Mesh
(74) *Attorney, Agent, or Firm* — Greenblum & Bernstein, P.L.C.

(57) ABSTRACT

An object is to provide an optical lens having low water-absorbing capacity and superior in heat resistance, transparency, and optical characteristics (refractive index, Abbe's number, and photoelastic coefficient). The optical lens includes a polyester resin containing a unit (A) of the following formula (1).

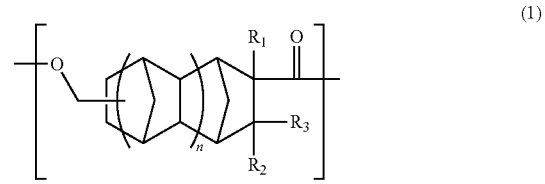

(1)

6 Claims, 2 Drawing Sheets

OPTICAL LENS

TECHNICAL FIELD

The present invention relates to optical lenses. More particularly, the present invention relates to an optical lens having low water-absorbing capacity and superior in heat resistance, transparency, and optical characteristics (refractive index, Abbe's number, and photoelastic coefficient).

BACKGROUND ART

Optical glasses or optical transparent resins are used as materials of optical elements for use in optical systems of liquid crystal display devices, optical disk devices, and projection screens or optical systems of various kinds of cameras such as cameras, film-integrated cameras, and video cameras. Optical glasses are superior in properties such as heat resistance, transparency, dimensional stability, and chemical resistance, and numerous kinds of optical glasses exist with varying refractive indices (nd) or Abbe's numbers (vd). However, these optical glasses pose the problems of high material cost, poor moldability, and low productivity. In particular, processing of optical glasses into aspherical lenses for use in aberration correction requires very sophisticated technology and high cost, and this constitutes a practically formidable obstacle.

In contrast to the case of optical glasses as described above, optical lenses including optical transparent resins, in particular thermoplastic transparent resins, have the advantage of being able to be mass-produced by injection molding and being able to be easily produced in the form of aspherical lenses. Such optical lenses are currently used mainly as camera lenses. Examples of the optical transparent resins include polyester resins (Patent Literatures 1 and 2), bisphenol A-based polycarbonate resins, and polymethyl methacrylate.

A key optical characteristic that should be considered in making an optical member with an optical transparent resin is birefringence. That is, optical transparent resins having high birefringence are not preferred in many cases. In particular, in the above-mentioned applications (such as liquid crystal displays, optical disk devices, and projection screens), the presence of a birefringent film or lens on the optical path adversely affects the image quality and signal reading performance, and the use of an optical member including an optical transparent resin with minimized birefringence is therefore desired. It should be understood that the birefringence is desirably low also for camera lenses and eyeglass lenses.

As is well-known in the art, birefringence exhibited by optical polymers is classified into "orientation birefringence" which is largely due to the orientation of the polymer main chain and "photoelastic birefringence" which arises from stresses. The sign of orientation birefringence or photoelastic birefringence is a property specific to an individual polymer and depends on the chemical structure of the polymer.

The orientation birefringence is birefringence typically exhibited as a result of orientation of the main chain of a chain polymer (polymer chain), and the main chain orientation is induced, for example, due to a process such as extrusion molding or stretching in production of a polymer film or a process involving flow of a material, such as injection molding which is widely used in production of optical members of various shapes. The thus induced orientation remains fixed in the resulting optical member. When the refractive index increases in a direction parallel to the direction of the orientation of the polymer chain, it is stated herein that the "orientation birefringence is positive", and when the refractive index increases in a direction orthogonal to the direction of the orientation, it is stated herein that the "orientation birefringence is negative".

Photoelastic birefringence is birefringence caused by elastic deformation (strain) of a polymer. In the case of an optical member made with a polymer, for example, volumetric shrinkage occurring during cooling from a temperature around the glass transition temperature of the polymer to a lower temperature causes elastic deformation (strain) in the material, and this elastic deformation remains and leads to photoelastic birefringence. Additionally, for example, an external force applied to an optical member fixed in a device used at ordinary temperature (equal to or lower than the glass transition temperature) can cause the material to undergo elastic deformation which gives rise to photoelastic birefringence. The smaller the photoelastic coefficient of the polymer is, the more reduced the occurrence of photoelastic birefringence is. As represented by the following equation, the photoelastic coefficient is defined as a coefficient $\gamma$ related to a stress difference $\Delta\sigma$ in the case where the stress difference $\Delta\sigma$ produces a birefringence difference $\Delta n$.

$$\Delta n = \gamma \Delta \sigma$$

When the refractive index increases in a direction parallel to the direction in which the tensile stress acts (the orientation direction of the polymer chain), it is stated herein that the "photoelastic birefringence is positive", and when the refractive index increases in a direction orthogonal to the direction in which the tensile stress acts, it is stated herein that the "photoelastic birefringence is negative".

In many cases, it is desirable for resins for optical lenses to have low water-absorbing capacity. Absorption of water into a resin causes a refractive index change due to the influence of water molecules present within the resin. If the distribution of water is non-uniform, the refractive index of the lens is also non-uniform, and the lens may be inapplicable to a high-precision optical design. Additionally, upon absorption of water, resins swell and experience a dimensional change. For example, in an optical system including a combination of a plurality of lenses, the occurrence of swelling by water absorption produces stresses between the lenses, causing breakage of the lenses or photoelastic birefringence. If the distribution of water is non-uniform, non-uniform plane deformation can also occur.

Generally, in optical systems of cameras, a plurality of concave and convex lenses having different optical characteristics are used to accomplish aberration correction for the purpose of improving the quality of color pictures. An example of such aberration correction is chromatic aberration correction achieved by a combination of a concave lens having a high refractive index and a low Abbe's number and a convex lens having a low refractive index and a high Abbe's number. In this case, chromatic aberration opposite in sign to chromatic aberration due to the convex lens is created by the concave lens to resultantly cancel out chromatic aberration. Greater chromatic aberration causes grater color deblurring, leading to an extreme degradation of the quality of color pictures.

Examples of optical lens materials having a high Abbe's number include inorganic materials such as calcium fluoride and organic materials such as polymethyl methacrylate.

CITATION LIST

Patent Literature

Patent Literature 1: Japanese Patent No. 5849967
Patent Literature 2: International Publication No. WO 2015/163323 A1

SUMMARY OF INVENTION

Technical Problem

However, calcium fluoride is an inorganic crystalline compound, and thus the use of calcium fluoride for an optical lens requires machining and grinding of single crystals. Further, calcium fluoride is soft, susceptible to scratches, and easily cleaved and thus has the disadvantage of requiring high production cost and being unsuitable for mass production.

Aromatic ring-containing polyester resins have poor optical characteristics with a high birefringence or high photoelastic coefficient. Completely aliphatic polyester resins have the problem of poor heat resistance. For these reasons, optical lenses containing conventional polyester resins are unsatisfactory in terms of heat resistance and optical characteristics.

Bisphenol A-based polycarbonate resins have shortcomings such as high birefringence and have only limited applications when used as lens materials. Polymethyl methacrylate is superior in optical characteristics but inferior in properties such as heat resistance and mechanical properties, and further has the problem of high water-absorbing capacity. Polymethyl methacrylate cannot, therefore, be used in the fields imposing requirements as to these properties.

Additionally, recent reduction in thickness and length of molded articles has created a demand for development of a lens that can be used in close proximity to a heat source. In particular, vehicle-mounted cameras for monitoring or other purposes are under active development. Vehicle-mounted lenses may need to have high heat resistance and high environmental resistance, in particular depending on the location.

The present invention has been made in view of the above problems of the prior art, and it is an object of the present invention to provide an optical lens having low water-absorbing capacity and superior in heat resistance, transparency, and optical characteristics (refractive index, Abbe's number, and photoelastic coefficient).

Solution to Problem

As a result of intensive investigations aimed at solving the above problems, the present inventors have found that an optical lens containing a polyester resin containing a particular alicyclic structure as a structural unit can be a solution to the above problems, and have completed the present invention.

That is, the present invention is as follows.

[1]

An optical lens comprising a polyester resin comprising a unit (A) of the following formula (1):

(1)

In the formula (1), $R_1$ is a hydrogen atom, $CH_3$, or $C_2H_5$, $R_2$ and $R_3$ are each independently a hydrogen atom or $CH_3$, and n is 0 or 1.

[2]

The optical lens according to [1], wherein, in the formula (1), n is 1.

[3]

The optical lens according to [1] or [2], wherein, in the formula (1), $R_1$, $R_2$, and $R_3$ are hydrogen atoms.

[4]

The optical lens according to any one of [1] to [3], wherein the polyester resin satisfies at least one of the following conditions (1) to (6):

(1) a glass transition temperature of the polyester resin is 120° C. or higher;

(2) an amount of heat generated by the polyester resin at cooling crystallization is 5 J/g or less;

(3) a water absorption percentage after immersion in water for 24 hours of the polyester resin is 0.25% or less;

(4) an absolute value of photoelastic coefficient of the polyester resin is $40 \times 10^{-12}$ $Pa^{-1}$ or less;

(5) a refractive index (nd) of the polyester resin is 1.60 or less; and (6) an Abbe's number (νd) of the polyester resin is 28 or more.

[5]

The optical lens according to any one of [1] to [4], wherein the optical lens is an aspherical lens.

[6]

The optical lens according to any one of [1] to [4], wherein the optical lens is for use in cameras.

[7]

An optical system comprising a combination of the optical lens according to any one of [1] to [6] and another optical lens.

Advantageous Effects of Invention

The present invention can provide an optical lens having low water-absorbing capacity and superior in heat resistance, transparency, and optical characteristics (refractive index, Abbe's number, and photoelastic coefficient).

DESCRIPTION OF EMBODIMENTS

An embodiment of the present invention (which will be simply referred to as "present embodiment" hereinafter) will now be described in detail. The present embodiment described below is only illustrative of the present invention and is not intended to limit the present invention to the contents of the following description. The present invention can be carried out with appropriate modifications falling within the gist of the invention.

[Polyester Resin]

An optical lens of the present embodiment includes a polyester resin containing a unit (A) of the following formula (1) (this unit may be referred to as "unit (A)" or "structural unit (A)" hereinafter). The resin may, if necessary, contain a diol unit (B) (this unit may be referred to as "unit (B)" or "structural unit (B)" hereinafter) and a unit (C) derived from a dicarboxylic acid or an ester-forming derivative thereof (this unit may be referred to as "unit (C)" or "structural unit (C)" hereinafter).

In the formula (1), $R_1$ is a hydrogen atom, $CH_3$, or $C_2H_5$, $R_2$ and $R_3$ are each independently a hydrogen atom or $CH_3$, and n is 0 or 1.

With the above configuration, the present invention makes it possible to suitably obtain an optical lens having low water-absorbing capacity and superior in heat resistance, transparency, and optical characteristics (refractive index, Abbe's number, and photoelastic coefficient). In the present embodiment, "superior in heat resistance" means that the glass transition temperature (Tg) as measured by the method described in Examples below is sufficiently high, "superior in transparency" means that the amount of heat generated at cooling crystallization, as measured by the method described in Examples below, is sufficiently small, and "superior in optical characteristics (refractive index, Abbe's number, and photoelastic coefficient)" means that the refractive index (nd) and the Abbe's number (vd) as measured by the methods described in Examples below can be adjusted as appropriate while the absolute value of photoelastic coefficient as measured by the method described in Examples below is kept sufficiently low.

In the formula (1), $R_1$ is preferably a hydrogen atom or $CH_3$, and $R_2$ and $R_3$ are preferably hydrogen atoms. In the present embodiment, $R_1$, $R_2$, and $R_3$ in the formula (1) are more preferably hydrogen atoms from the viewpoint of heat resistance.

In the formula (1), n is preferably 1 in order to further improve the heat resistance.

In the present embodiment, the content of the structural unit (A) based on the total structural units of the polyester resin is preferably 10 to 95 mol % from the viewpoint of the balance of transparency, heat resistance, and optical characteristics. When the content is 10 mol % or more, sufficiently good heat resistance and optical characteristics tend to be achieved. The reason why the content is preferably 95 mol % or less is that in this case the formability of the film can be improved while good heat resistance and optical characteristics are obtained. From the same viewpoint, the content of the unit (A) is more preferably 15 to 95 mol % and even more preferably 20 to 95 mol %.

In a preferred aspect, the optical lens of the present invention includes a homopolyester resin containing the structural unit (A).

In another preferred aspect, the optical lens of the present invention includes a copolymerized polyester resin containing the structural unit (A), the structural unit (B), and the structural unit (C).

The structural unit (B) is not particularly limited and may be any unit derived from a diol, and specific examples of the structural unit (B) include units derived from the following diols: ethylene glycol, trimethylene glycol, 1,4-butanediol, 1,5-pentanediol, 1,6-hexanediol, diethylene glycol, propylene glycol, neopentyl glycol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, pentacyclopentadecanedimethanol, decahydro-1,4:5,8-dimethanonaphthalenedimethanol, norbornanediol, cyclohexanediol, 2,2'-bis(4-hydroxycyclohexyl)propane, adamantanediol, decahydro-1,4:5,8-dimethanonaphthalenediol, 9,9-bis[4-(2-hydroxyethoxy)phenyl]fluorene, 9,9-bis[4-(2-hydroxypropoxy)phenyl]fluorene, 9,9-bis[4-(2-hydroxyethoxy)-3-methylphenyl]fluorene, 9,9-bis[4-(2-hydroxypropoxy)-3-methylphenyl]fluorene, 9,9-bis[4-(2-hydroxyethoxy)-3,5-dimethylphenyl]fluorene, 9,9-bis[4-(2-hydroxyethoxy)-3-phenylphenyl]fluorene, 9,9-bis[4-(2-hydroxypropoxy)-3-phenylphenyl]fluorene, 9,9-bis[6-(2-hydroxyethoxy)-2-naphthyl]fluorene, 9,9-bis[6-(2-hydroxypropoxy)-2-naphthyl]fluorene, 9,9-bis(2-hydroxyethyl)fluorene, xylylene glycol, 3,9-bis(1,1-dimethyl-2-hydroxyethyl)-2,4,8,10-tetraoxaspiro[5.5]undecane, 1,4:3,6-dianhydro-D-sorbitol, and 2,2,4,4-tetramethyl-1,3-cyclobutanediol.

The structural unit (B) is preferably a unit derived from an aliphatic diol or a diol having a fluorene structure in order to obtain good optical characteristics. The unit derived from a diol having a fluorene structure more preferably has a cardo structure in addition to the fluorene structure. The unit derived from an aliphatic diol is more preferably a unit derived from 1,4-cyclohexanedimethanol, ethylene glycol, 3,9-bis(1,1-dimethyl-2-hydroxyethyl)-2,4,8,10-tetraoxaspiro[5.5]undecane, 1,4:3,6-dianhydro-D-sorbitol, or decahydro-1,4:5,8-dimethanonaphthalenedimethanol. The unit derived from a diol having a fluorene structure is more preferably a unit derived from 9,9-bis[4-(2-hydroxyethoxy)phenyl]fluorene, 9,9-bis[4-(2-hydroxyethoxy)-3-methylphenyl]fluorene, or 9,9-bis[4-(2-hydroxyethoxy)-3-phenylphenyl]fluorene. The optical isomerism of these diols is not particularly limited, and they may be a cis isomer, a trans isomer, or a mixture thereof.

One of the above units may be contained alone, or two or more of the above units may be contained in combination.

The structural unit (C) is not particularly limited and may be any unit derived from a dicarboxylic acid or an ester-forming derivative of the dicarboxylic acid. Specific examples of the unit (C) include: structural units derived from aromatic dicarboxylic acids such as terephthalic acid, isophthalic acid, phthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 2-methylterephthalic acid, biphenyldicarboxylic acid, and tetralindicarboxylic acid and/or derivatives of these aromatic dicarboxylic acids; units derived from aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclopentadecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane, 1,4:5,8-dimethanodecahydronaphthalenedicarboxylic acid, adamantanedicarboxylic acid, and dimer acids and/or derivatives of these aliphatic dicarboxylic acids; and units derived from dicarboxylic acids having a cardo structure such as 9,9-bis(carboxymethyl)fluorene, 9,9-bis(1-carboxyethyl)fluorene, 9,9-bis(2-carboxyethyl)fluorene, 9,9-bis(1-carboxypropyl)fluorene, 9,9-bis(2-carboxypropyl) fluorene, 9,9-bis(2-carboxy-1-methylethyl)fluorene, 9,9-bis(2-carboxy-1-methylpropyl)fluorene, 9,9-bis(2-carboxybutyl)fluorene, 9,9-bis(2-carboxy-1-methylbutyl) fluorene, and 9,9-bis(5-carboxypentyl)fluorene and/or derivatives of these dicarboxylic acids having a fluorene structure.

In order to obtain good optical characteristics, the structural unit (C) is preferably a unit derived from an aliphatic dicarboxylic acid or an ester-forming derivative thereof or a unit derived from a dicarboxylic acid having a fluorene structure or an ester-forming derivative thereof. The unit derived from a dicarboxylic acid having a fluorene structure or an ester-forming derivative thereof more preferably has a cardo structure in addition to the fluorene structure. The unit derived from an aliphatic dicarboxylic acid or an ester-forming derivative thereof is more preferably a unit derived from dimethyl 1,4-cyclohexanedicarboxylate from the viewpoint of the property balance of transparency, heat resistance, and optical characteristics. The unit derived from a dicarboxylic acid having a fluorene structure or an ester-forming derivative thereof is more preferably a unit derived from 9,9-bis(methoxycarbonylmethyl)fluorene, 9,9-bis(2-methoxycarbonylethyl)fluorene, or 9,9-bis(methoxycarbonylpropyl)fluorene from the viewpoint of the property balance of transparency, heat resistance, and optical characteristics. The optical isomerism of these dicarboxylic acids and derivatives thereof is not particularly limited, and they may be a cis isomer, a trans isomer, or a mixture thereof.

One of the above units may be contained alone, or two or more of the above units may be contained in combination.

In the present embodiment, the polyester resin may contain a hydroxyl group and a unit other than the units (A) to (C), and the other unit is, for example, a unit (A1) derived from a carboxylic acid or an ester-forming derivative thereof. The unit (A1) is not particularly limited, and examples thereof include units derived from oxyacids such as glycolic acid, lactic acid, hydroxybutyric acid, 2-hydroxyisobutyric acid, hydroxybenzoic acid, 6-hydroxycaproic acid, and 4-hydroxycyclohexanecarboxylic acid and/or derivatives of these oxyacids.

In the present embodiment, the polyester resin is not particularly limited as long as the effect of the present invention is obtained. The polyester resin preferably satisfies at least one of the following conditions (1) to (6), more preferably satisfies the conditions (1) to (4), and even more preferably satisfies all of the conditions (1) to (6).

(1) In the present embodiment, the glass transition temperature (Tg) of the polyester resin is not particularly limited as long as the effect of the present invention is obtained. In order to obtain sufficient heat resistance, the glass transition temperature is preferably 120° C. or higher, more preferably 130° C. or higher, and even more preferably 140° C. or higher. The upper limit is not particularly limited and is, for example, 240° C. The Tg can be measured by the method described in Examples below. The Tg can be adjusted within the above range, for example, by appropriately adjusting the proportions of starting monomers for the polyester resin in copolymerization.

(2) In the present embodiment, the amount of heat generated by the polyester resin at cooling crystallization is not particularly limited as long as the effect of the present invention is obtained. In order to obtain sufficient transparency, the amount of heat generated at cooling crystallization is preferably 5 J/g or less, more preferably 1 J/g or less, and even more preferably 0.3 J/g or less. The lower limit is not particularly limited and is, for example, 0 J/g. The amount of heat generated at cooling crystallization can be measured by the method described in Examples below. The amount of heat generated at cooling crystallization can be adjusted within the above range, for example, by appropriately adjusting the proportions of starting monomers for the polyester resin in copolymerization.

(3) In the present embodiment, the water absorption percentage after immersion in water for 24 hours of the polyester resin is not particularly limited as long as the effect of the present invention is obtained. In order to reduce the deformation and change in refractive index due to water absorption, the water absorption percentage is preferably 0.25% or less, more preferably 0.23% or less, even more preferably 0.21% or less, and still even more preferably 0.20% or less. The lower limit is not particularly limited and is, for example 0.01%. The water absorption percentage can be measured by the method described in Examples below. The water absorption percentage can be adjusted within the above range, for example, by appropriately adjusting the proportions of starting monomers for the polyester resin in copolymerization.

The polyester resin in the present invention is superior in optical characteristics (refractive index, Abbe's number, and photoelastic coefficient). Specifically, by virtue of the particular structure of the polyester resin, the refractive index and the Abbe's number can be adjusted as appropriate while the absolute value of the photoelastic coefficient is kept sufficiently low. For example, the refractive index, Abbe's number, and photoelastic coefficient can be adjusted within the ranges described below by appropriately adjusting the proportions of starting monomers for the polyester resin in copolymerization.

(4) The absolute value of the photoelastic coefficient is not particularly limited as long as the effect of the present invention is obtained. The absolute value of the photoelastic coefficient is preferably $40 \times 10^{-12}$ $Pa^{-1}$ or less, more preferably $35 \times 10^{-12}$ $Pa^{-1}$ or less, and even more preferably $30 \times 10^{-12}$ $Pa^{-1}$ or less. The lower limit is not particularly limited and is, for example, $0.01 \times 10^{-12}$ $Pa^{-1}$. The absolute value of the photoelastic coefficient can be measured by the method described in Examples below.

(5) The refractive index (nd) for d-line wavelength light is not particularly limited as long as the effect of the present invention is obtained. The refractive index is preferably 1.60 or less, more preferably 1.59 or less, even more preferably 1.58 or less, still even more preferably 1.57 or less, and particularly preferably 1.56 or less. In view of the practical use of the optical lens of the present invention, the lower limit of the refractive index is, but not particularly limited to, about 1.40. The refractive index for d-line wavelength light can be measured by the method described in Examples below.

(6) The Abbe's number (vd) is not particularly limited as long as the effect of the present invention is obtained. The Abbe's number is preferably 28 or more, more preferably 30 or more, even more preferably 31 or more, still even more preferably 35 or more, and particularly preferably 40 or more. In view of the practical use of the optical lens of the present invention, the upper limit of the Abbe's number is, but not particularly limited to, about 70. The Abbe's number can be measured by the method described in Examples below.

The Abbe's number (vd) is a parameter expressed by the equation (1) shown in Examples and indicative of the wavelength dependence of the refractive index. Thus, a material with a higher Abbe's number shows a smaller change in refractive index with changing wavelength and has lower chromatic aberration.

Being superior in optical characteristics (refractive index, Abbe's number, and photoelastic coefficient), the polyester resin in the present invention can be suitably used, for example, as a material of optical components such as: optical lenses for imaging or projection in cameras, video cameras, projection televisions, laser printers, or microlens arrays; and information transmission components such as optical fibers, connectors for optical fibers, and optical waveguides.

When the polyester resin of the present embodiment is used, it is suitable to add a known additive such as an antioxidant, a release agent, an ultraviolet absorber, a flowability improver, a crystal nucleating agent, a toughener, a dye, an anti-static agent, or an anti-microbial agent.

[Method of Producing Polyester Resin]

The polyester resin can be obtained by homopolymerization of a monomer corresponding to the unit (A) or by copolymerization of monomers corresponding to the units (A) to (C). The following will describe a method of producing a monomer corresponding to the unit (A). Such a monomer is represented, for example, by the following formula (2).

(2)

In the formula (2), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In the formula (2), $R_1$ is preferably a hydrogen atom or $CH_3$. $R_2$ and $R_3$ are preferably hydrogen atoms. Examples of the hydrocarbon group include, but are not limited to, methyl, ethyl, propyl, butyl, vinyl, 2-hydroxyethyl, and 4-hydroxybutyl groups.

The compound of the formula (2) in the present embodiment can be synthesized, for example, by a route of the following formula (I) using dicyclopentadiene or cyclopentadiene and a functional group-containing olefin as starting materials.

(I)

In the formula (I), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

[Production of $C_{13}$ to $C_{21}$ Monoolefin of Formula (4) in Formula (I)]

The $C_{13}$ to $C_{21}$ monoolefin of the formula (4) can be produced, for example, by a Diels-Alder reaction between a functional group-containing olefin and dicyclopentadiene.

Specific examples of the functional group-containing olefin used for the Diels-Alder reaction include, but are not limited to, methacrylic acid, methyl methacrylate, ethyl methacrylate, propyl methacrylate, butyl methacrylate, vinyl methacrylate, 2-hydroxyethyl methacrylate, 4-hydroxybutyl methacrylate, acrylic acid, methyl acrylate, ethyl acrylate, propyl acrylate, butyl acrylate, vinyl acrylate, 2-hydroxyethyl acrylate, 4-hydroxybutyl acrylate, crotonic acid, methyl crotonate, ethyl crotonate, 3-methylcrotonic acid, methyl 3-methylcrotonate, and ethyl 3-ethylcrotonate. Preferred olefins include methacrylic acid, methyl methacrylate, 2-hydroxyethyl methacrylate, acrylic acid, methyl acrylate, and 2-hydroxyethyl acrylate. More preferred olefins include methyl methacrylate and methyl acrylate.

Examples of the functional group-containing olefin used for the Diels-Alder reaction further include acrylonitrile, methacrylonitrile, acrolein, and methacrolein. With the use of such an olefin as a starting material, for example, a monoolefin of formula (4') can be produced by the route of the following formula (II) or (III).

(II)

-continued (5)

(4')

In the formula (II), $R_1$ is a hydrogen atom or $CH_3$.

(III)

(6)

(4')

In the formula (III), $R_1$ is a hydrogen atom or $CH_3$.

The dicyclopentadiene used for the Diels-Alder reaction is preferably highly pure, and the contents of butadiene, isoprene, and other substances are preferably reduced. The purity of the dicyclopentadiene is preferably 90% or more and more preferably 95% or more. Dicyclopentadiene is prone to be depolymerized into cyclopentadiene (so-called monocyclopentadiene) under heating conditions, and it is thus possible to use cyclopentadiene instead of dicyclopentadiene. The $C_{13}$ to $C_{21}$ monoolefin of the formula (4) is thought to be produced substantially via a $C_8$ to $C_{16}$ monoolefin of the following formula (7) (product of first Diels-Alder reaction), and the produced monoolefin of the formula (7) is thought to act as a new diene-reactive compound (dienophile) which is involved in a Diels-Alder reaction (second Diels-Alder reaction) with cyclopentadiene (diene) present in the reaction system to produce the $C_{13}$ to $C_{21}$ monoolefin of the formula (4).

In view of these points, for example, the $C_{13}$ to $C_{21}$ monoolefin of the formula (4) or the $C_8$ to $C_{16}$ monoolefin of the formula (7) can be selectively obtained by appropriately controlling the reaction conditions of the first Diels-Alder reaction in the reaction route of the formula (I).

(7)

In the formula (7), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In order to allow the two-step Diels-Alder reaction to proceed efficiently, i.e., in order to selectively obtain the $C_{13}$ to $C_{21}$ monoolefin of the formula (4), the presence of cyclopentadiene in the reaction system is important. Therefore, the reaction temperature is preferably 100° C. or higher, more preferably 120° C. or higher, and even more preferably 130° C. or higher. In order to selectively obtain the $C_8$ to $C_{16}$ monoolefin of the formula (7), the reaction temperature is preferably lower than 180° C. In either case, the reaction is preferably carried out at a temperature of 250° C. or lower in order to inhibit formation of a high-boiling substance as a by-product.

The $C_{13}$ to $C_{21}$ monoolefin of the formula (4) obtained as described above can be subjected to a hydroformylation reaction and reduction reaction as described below to obtain a monomer corresponding to the unit of the formula (1) wherein n=1 (i.e., a compound of the formula (2)). The $C_8$ to $C_{16}$ monoolefin of the formula (7) obtained as described above can be subjected to a similar hydroformylation reaction and reduction reaction to obtain a monomer corresponding to the unit of the formula (1) wherein n=0 (i.e., a compound of the formula (8)).

A hydrocarbon, an alcohol, or an ester can also be used as the reaction solvent and, for example, aliphatic hydrocarbons having 6 or more carbon atoms, cyclohexane, toluene, xylene, ethylbenzene, mesitylene, propanol, and butanol are preferred. A known catalyst such as $AlCl_3$ may be added if necessary.

(8)

In the formula (8), $R_1$ is a hydrogen atom, $CH_3$, or $C_2H_5$, $R_2$ and $R_3$ are each independently a hydrogen atom or $CH_3$, and X is a hydrogen atom or a hydrocarbon group having four or less carbon atoms and optionally containing a hydroxyl group.

The Diels-Alder reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate is made to flow in a tubular reactor under predetermined reaction conditions.

The reaction product as obtained by the Diels-Alder reaction may directly be used as a starting material for the hydroformylation reaction or may be purified by a technique such as distillation, extraction, or crystallization prior to being subjected to the subsequent step.

[Production of $C_{14}$ to $C_{22}$ Difunctional Compound of Formula (3) in Formula (I)]

The $C_{14}$ to $C_{22}$ difunctional compound of the formula (3) in the formula (I) can be produced, for example, by subjecting the $C_{13}$ to $C_{21}$ monoolefin of the formula (4), carbon monoxide gas, and hydrogen gas to a hydroformylation reaction in the presence of a rhodium compound and an organophosphorus compound.

The rhodium compound used in the hydroformylation reaction may be any compound which forms a complex with an organophosphorus compound and which exhibits hydroformylation activity in the presence of carbon monoxide and hydrogen, and the form of the precursor of the rhodium compound is not particularly limited. For example, a catalyst precursor such as dicarbonylacetylacetonato rhodium (hereinafter referred to as "Rh(acac)(CO)$_2$"), $Rh_2O_3$, $Rh_4(CO)_{12}$, $Rh_6(CO)_{16}$, or $Rh(NO_3)_3$ may be introduced, together with an organophosphorus compound, into a reaction mixture, and thus a rhodium carbonyl hydride-phosphorus complex having catalytic activity may be formed in a reaction vessel. Alternatively, a rhodium carbonyl hydride-phosphorus complex may be prepared beforehand, and the prepared complex may be introduced into a reactor. A specific example of preferred methods is a method in which Rh(acac)(CO)$_2$ is reacted with an organophosphorus compound in the presence of a solvent and then the reaction product is introduced together with excess of the organophosphorus compound into a reactor so as to give a rhodium-organophosphorus complex having catalytic activity.

Investigations by the present inventors have revealed that a two-step Diels-Alder reaction product as represented by the formula (4) which has an internal olefin with a relatively high molecular weight can be hydroformylated with an extremely small amount of rhodium catalyst. The amount of the rhodium compound used in the hydroformylation reaction is preferably 0.1 to 60 micromoles, more preferably 0.1 to 30 micromoles, even more preferably 0.2 to 20 micromoles, and particularly preferably 0.5 to 10 micromoles, based on 1 mole of the $C_{13}$ to $C_{21}$ monoolefin of the formula (4) which is a substrate in the hydroformylation reaction. When the amount of the rhodium compound used is less than 60 micromoles based on 1 mole of the $C_{13}$ to $C_{21}$ monoolefin, it can be considered that there is no practical need for any installation for collecting and recycling the rhodium complex. Thus, the present embodiment enables reduction in economic burden associated with collecting/recycling installations, thereby allowing reduction in cost associated with rhodium catalysts.

The organophosphorus compound which forms the hydroformylation reaction catalyst for the hydroformylation reaction in the present embodiment together with the rhodium compound is not particularly limited, and examples of the organophosphorus compound include a phosphine of the formula P(—$R_a$)(—$R_b$)(—$R_c$) and a phosphite of the formula P(—$OR_a$)(—$OR_b$)(—$OR_c$). Specific examples of $R_a$, $R_b$, and $R_c$ include, but are not limited to, an aryl group which may be substituted with a $C_1$ to $C_4$ alkyl or alkoxy group and an alicyclic alkyl group which may be substituted with a $C_1$ to $C_4$ alkyl or alkoxy group. Triphenylphosphine and triphenyl phosphite are suitably used. The amount of the organophosphorus compound used is preferably 300 to 10000 times, more preferably 500 to 10000 times, even more preferably 700 to 5000 times, particularly preferably 900 to 2000 times, the amount of rhodium atoms in the rhodium compound on a molar basis. When the amount of the organophosphorus compound used is 300 or more times the amount of rhodium atoms on a molar basis, sufficient stability of the rhodium carbonyl hydride-phosphorus complex serving as a catalytically active material tends to be obtained, with the result that good reactivity tends to be obtained. The reason why the amount of the organophosphorus compound used is preferably 10000 or less times the amount of rhodium atoms on a molar basis is that in this case the cost spent on the organophosphorus compound can be sufficiently reduced.

The hydroformylation reaction can be carried out without the use of any solvent. However, with the use of a solvent inert in the reaction, the reaction can be accomplished in a more preferred manner. The solvent used in the hydroformylation reaction is not particularly limited and can be any solvent capable of dissolving the $C_{13}$ to $C_{21}$ monoolefin of the formula (4), dicyclopentadiene or cyclopentadiene, the rhodium compound, and the organophosphorus compound. Specific examples of the solvent include, but are not limited to: hydrocarbons such as aliphatic hydrocarbons, alicyclic hydrocarbons, and aromatic hydrocarbons; esters such as aliphatic esters, alicyclic esters, and aromatic esters; alcohols such as aliphatic alcohols and alicyclic alcohols; and solvents such as aromatic halides. Among these, hydrocarbons are suitably used and, in particular, alicyclic hydrocarbons and aromatic hydrocarbons are more suitably used.

The temperature during the hydroformylation reaction is preferably 40° C. to 160° C. and more preferably 80° C. to 140° C. When the reaction temperature is 40° C. or higher, a sufficient reaction rate tends to be achieved, and the monoolefin as a starting material tends to be prevented from remaining unreacted. Setting the reaction temperature to 160° C. or lower tends to reduce formation of by-products derived from the starting monoolefin or the reaction product and effectively prevent decrease in reaction performance.

The hydroformylation reaction in the present embodiment is preferably carried out under pressurization with carbon monoxide (occasionally referred to as "CO" hereinafter) gas and hydrogen (occasionally referred to as "$H_2$" hereinafter) gas. In this case, the CO and $H_2$ gases can be each independently introduced into the reaction system or can be introduced into the reaction system together in the form of a mixed gas prepared beforehand. The molar ratio between the CO and $H_2$ gases (=CO/$H_2$) introduced into the reaction system is preferably 0.2 to 5, more preferably 0.5 to 2, and even more preferably 0.8 to 1.2. When the molar ratio between the CO and $H_2$ gasses is adjusted within the above range, the activity of the hydroformylation reaction or the selectivity to the intended aldehyde tends to be increased. The amount of the CO and $H_2$ gases introduced into the reaction system decreases as the reaction proceeds, and thus the use of a CO/$H_2$ mixed gas prepared beforehand may facilitate the reaction control.

The reaction pressure in the hydroformylation reaction is preferably 1 to 12 MPa, more preferably 1.2 to 9 MPa, and even more preferably 1.5 to 5 MPa. Setting the reaction pressure to 1 MPa or more tends to provide a sufficient reaction rate, and tends to sufficiently prevent the monoolefin as a starting material from remaining unreacted. Setting the reaction pressure to 12 MPa or less eliminates the need for any expensive installation having high pressure resistance and is therefore economically advantageous. In particular, when the reaction is carried out in a batch mode or semibatch mode which involves depressurization by discharge of the CO and $H_2$ gases after completion of the reaction, a lower reaction pressure causes a smaller loss of the CO and $H_2$ gases and is therefore more economically advantageous.

The suitable reaction mode of the hydroformylation reaction is a batch reaction or semibatch reaction. The semibatch reaction can be carried out by placing the rhodium compound, the organophosphorus compound, and the solvent in a reactor, creating the previously described reaction conditions through pressurization with a $CO/H_2$ gas and/or heating, and then supplying the monoolefin as a starting material or a solution of the monoolefin to the reactor.

The reaction product as obtained by the hydroformylation reaction may directly be used as a starting material for the subsequent reduction reaction or may be purified by distillation, extraction, or crystallization prior to being subjected to the subsequent step.

[Production of $C_{14}$ to $C_{22}$ Compound of Formula (2)]

The $C_{14}$ to $C_{22}$ compound of the formula (2) in the formula (I) can be produced by a reduction reaction of the $C_{14}$ to $C_{22}$ compound of the formula (3) in the presence of a catalyst having hydrogenation activity and hydrogen.

In the reduction reaction, a catalyst containing at least one element selected from the group consisting of copper, chromium, iron, zinc, aluminum, nickel, cobalt, and palladium is preferably used as the catalyst having hydrogenation activity. Examples of more preferred catalysts include a Cu—Cr catalyst, a Cu—Zn catalyst, and a Cu—Zn—Al catalyst and further include a Raney-Ni catalyst and a Raney-Co catalyst. A Cu—Cr catalyst and a Raney-Co catalyst are even more preferred.

The amount of the hydrogenation catalyst used is 1 to 100% by mass, preferably 2 to 50% by mass, and more preferably 5 to 30% by mass based on the $C_{14}$ to $C_{22}$ compound of the formula (3) which is a substrate. Setting the amount of the catalyst used within these ranges enables the hydrogenation reaction to take place in a suitable manner. When the amount of the catalyst used is 1% by mass or more, the reaction tends to be achieved sufficiently to obtain a sufficient yield of the intended product. When the amount of the catalyst used is 100% by mass or less, a good balance tends to be established between the amount of the catalyst used for the reaction and the increasing effect on the reaction rate.

The reaction temperature in the reduction reaction is preferably 60 to 200° C. and more preferably 80° C. to 150° C. Setting the reaction temperature to 200° C. or lower tends to prevent the occurrence of side reaction or decomposition reaction and give the intended product in a high yield. Setting the reaction temperature to 60° C. or higher tends to allow completion of the reaction in a moderate period of time and enable avoidance of decrease in productivity or decrease in yield of the intended product.

The reaction pressure in the reduction reaction, as expressed by a hydrogen partial pressure, is preferably 0.5 to 10 MPa and more preferably 1 to 5 MPa. Setting the hydrogen partial pressure to 10 MPa or less tends to prevent the occurrence of side reaction or decomposition reaction and give the intended product in a high yield. Setting the hydrogen partial pressure to 0.5 MPa or more tends to allow completion of the reaction in a moderate period of time and enable avoidance of decrease in productivity or decrease in yield of the intended product. In the reduction reaction, an inert gas (such as nitrogen or argon) may be additionally present.

In the reduction reaction, a solvent can be used. Examples of the solvent used in the reduction reaction include aliphatic hydrocarbons, alicyclic hydrocarbons, aromatic hydrocarbons, and alcohols, among which alicyclic hydrocarbons, aromatic hydrocarbons, and alcohols are preferred. Specific examples of the solvent include cyclohexane, toluene, xylene, methanol, ethanol, and 1-propanol.

The reduction reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate or substrate solution is made to flow in a tubular reactor filled with a forming catalyst under predetermined reaction conditions.

The reaction product obtained by the reduction reaction can be purified, for example, by distillation, extraction, or crystallization.

The method used in the present embodiment to copolymerize the compound of the formula (2) or the compound of the formula (8) as a monomer corresponding to the unit (A) with other monomers corresponding to the units (B) and (C) is not particularly limited, and a conventionally known method for producing polyester can be employed. Examples of the method include: melt polymerization methods such as transesterification and direct esterification; and solution polymerization methods.

For production of the polyester resin of the present embodiment, a catalyst used for production of common polyester resins, such as a transesterification catalyst, an esterification catalyst, or a polycondensation catalyst, may be used. The catalyst is not particularly limited, and examples thereof include: compounds (e.g., fatty acid salts, carbonic acid salts, phosphoric acid salts, hydroxides, chlorides, oxides, and alkoxides) of metals such as zinc, lead, cerium, cadmium, manganese, cobalt, lithium, sodium, potassium, calcium, nickel, magnesium, vanadium, aluminum, titanium, antimony, germanium, and tin; and metallic magnesium. These may be used alone, or two or more thereof may be used in combination. Among the above examples, preferred catalysts are compounds of manganese, cobalt, zinc, titanium, calcium, antimony, germanium, and tin. Compounds of manganese, titanium, antimony, germanium, and tin are more preferred. The amount of such a catalyst used is not particularly limited. The catalyst amount on a metal component basis is preferably 1 to 1000 ppm, more preferably 3 to 750 ppm, and even more preferably 5 to 500 ppm based on the starting materials for the polyester resin.

The reaction temperature in the polymerization reaction depends on the type and amount of the catalyst used and is typically selected in the range of 150° C. to 300° C. From the viewpoint of the reaction rate and coloring of the resulting resin, the reaction temperature is preferably 180° C. to 280° C. It is preferable that the pressure inside the reaction tank be initially atmospheric pressure and finally controlled to 1 kPa or less, more preferably to 0.5 kPa or less.

For the polymerization reaction, a phosphorus compound may be added if desired. Examples of the phosphorus compound include, but are not limited to, phosphoric acid, phosphorous acid, phosphoric acid esters, and phosphorous acid esters. Examples of the phosphoric acid esters include, but are not limited to, methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate, and triphenyl phosphate. Examples of the phosphorous acid esters include, but are not limited to, methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite, and triphenyl phosphite. These may be used alone, or two or more thereof may be used in combination. The concentration of phosphorus atoms in the polyester resin of the present embodiment is preferably 1 to 500 ppm, more preferably 5 to 400 ppm, and even more preferably 10 to 200 ppm.

For production of the polyester resin of the present embodiment, an etherification inhibitor, a stabilizer such as a thermal stabilizer or light stabilizer, and a polymerization modifier can be used.

Various additives and a forming aid can be added to the polyester resin of the present embodiment as long as the purpose of the present embodiment is not impaired, and examples of the additives include an antioxidant, a light stabilizer, an ultraviolet absorber, a plasticizer, an extender, a delustrant, a drying regulator, an anti-static agent, an anti-settling agent, a surfactant, a flow modifier, a drying oil, a wax, a filler, a colorant, a reinforcing agent, a surface smoothing agent, a leveling agent, a curing accelerator, and a thickener.

The polyester resin of the present embodiment may be in the form of a resin composition further containing a resin other than the polyester resin in the present embodiment, as long as the intended effect of the present embodiment is not impaired. The other resin which may be further contained is not particularly limited and is, for example, at least one resin selected from the group consisting of polyester resins other than the polyester resin in the present embodiment, polycarbonate resins, (meth)acrylic resins, polyamide resins, polystyrene resins, cycloolefin resins, acrylonitrile-butadiene-styrene copolymer resins, vinyl chloride resins, polyphenylene ether resins, polysulfone resins, polyacetal resins, and methyl methacrylate-styrene copolymer resins. These resins can be known resins, and one of these resins or a combination of two or more of these resins may be added to the resin composition.

[Optical Lens and Method of Producing the Same]

The optical lens of the present invention is, for example, an imaging lens for use in cameras or video cameras, a projection lens for use in projection televisions or projection screens, a fθ lens for use in laser printers, or a lens for use in microlens arrays, liquid crystal display devices, optical disk devices, or vehicle-mounted cameras.

The method for molding the optical lens is not particularly limited, and examples of the method include injection molding, press molding, compression molding, injection/compression molding, and extrusion molding. In the molding, a known additive such as an ultraviolet absorber, an antioxidant, a flame retardant, an anti-static agent, or a colorant can be added as long as the effect of the present invention is obtained.

The optical lens of the present invention can be suitably obtained by, in particular, injection-molding the polyester resin of the present embodiment into the shape of a lens using an injection molding machine or an injection/compression molding machine. In obtaining the optical lens, the molding environment should naturally be an environment having a low dust content in order to minimize inclusion of foreign matter. The environment is preferably class 1000 or cleaner and more preferably class 100 or cleaner.

The optical lens of the present invention can be particularly suitably implemented by being used in the form of an aspherical lens if necessary. The use of the single aspherical lens can reduce spherical aberration to substantially zero and thus eliminates the need to use a combination of a plurality of spherical lenses to remove spherical aberration, enabling reduction in weight and reduction in production cost. The aspherical lens is therefore useful, in particular, as a camera lens among optical lenses. The astigmatism of the aspherical lens is preferably 0 to 15 m$\lambda$ and more preferably 0 to 10 m$\lambda$.

The thickness of the optical lens of the present invention is not particularly limited and can be set over a wide range depending on the intended use. The thickness is preferably 0.01 to 30 mm and more preferably 0.1 to 15 mm.

If necessary, a coat layer such as an anti-reflection layer or hard coat layer may be provided on a surface of the optical lens of the present invention. The anti-reflection layer may consist of a single layer or a plurality of layers and may include an organic substance or an inorganic substance. The anti-reflection layer preferably includes an inorganic substance. Specific examples of the inorganic substance include oxides such as silicon oxide, aluminum oxide, zirconium oxide, titanium oxide, cerium oxide and magnesium oxide, and fluorides such as magnesium fluoride.

The optical lens of the present invention can be used as any of various lenses such as pickup lenses, f-θ lenses, and eyeglass lenses. To be specific, the optical lens of the present invention can be suitably used as a lens of a single-lens reflex camera, a digital still camera, a video camera, a camera-equipped mobile phone, a lens-equipped film, a telescope, a binocular telescope, a microscope, a liquid crystal display device, an optical disk device, a projector, or a vehicle-mounted camera. When the optical lens of the present invention is a convex lens, the optical lens can be used in combination with a concave lens, and when the optical lens is a concave lens, the optical lens can be used in combination with a convex lens. Both of the combined uses can offer an optical system having low chromatic aberration.

EXAMPLES

Hereinafter, the present invention will be described in more detail with examples. The scope of the present invention is not limited by the examples.

[Method for Evaluation of Polyester Resin]

(1) Copolymerization Composition

The copolymerization composition of the polyester resin was determined by measuring $^1$H-NMR and $^{13}$C-NMR spectra and calculating the ratio between the areas of the peaks attributed to the different structural units. The measurement apparatus used was a nuclear magnetic resonance apparatus (available from Bruker BioSpin, product name: AVANCE III 500/Ascend 500), and the measurement was conducted at 500 MHz. The solvent used was deuterated chloroform.

(2) Glass Transition Temperature (Tg)

The glass transition temperature of the polyester resin was measured using a differential scanning calorimeter (available from Shimadzu Corporation, product name: DSC/TA-60WS). A measurement sample was prepared by placing 5 to 10 mg of the polyester resin in an unsealed aluminum vessel, heating the polyester resin to 280° C. at a temperature rise rate of 20° C./min under a stream of nitrogen gas (50 mL/min), and rapidly cooling the heated resin. This sample was heated again under the same conditions, and the glass transition temperature was determined as a temperature at which the change in the DSC curve reached ½ of the difference in the baseline before and after transition (middle-point glass transition temperature).

(3) Amount of Heat Generated at Cooling Crystallization (ΔHc)

The amount of heat generated by the polyester resin at cooling crystallization was calculated from the area of an exothermic peak that appeared during temperature decrease at a rate of 5° C./min after holding at 280° C. for 1 minute following the measurement of Tg.

(4) Water Absorption Percentage (%)

For measurement of the water absorption percentage of the polyester resin, a disc-shaped press-molded body having a diameter of 40 mm and a thickness of 3 mm was produced by the method described below and used as a measurement sample. This sample was dried using a vacuum dryer set at a temperature 30° C. below the glass transition temperature for 48 hours, after which the sample was immersed in water at 23° C. for 24 hours. After the lapse of 24 hours, the sample was taken out of water, and the water absorption percentage was calculated using the following equation (2) from the weights of the sample before and after water absorption.

$$\Delta W = (W - W_0)/W_0 \times 100 \qquad \text{Equation (2):}$$

In the equation (2), ΔW denotes the water absorption percentage [%], W denotes the weight [g] after water absorption, and $W_0$ denotes the weight [g] before water absorption.

(5) Refractive Index (Nd) and Abbe's Number (νd)

For measurement of the refractive index and Abbe's number of the polyester resin, a disc-shaped press-molded body having a diameter of 40 mm and a thickness of 3 mm was produced by the method described below, and a rectangular piece was cut out from the center of the press-molded body and used as a measurement sample. This sample was annealed using a dryer at a temperature 20° C. below the glass transition temperature for 10 hours, after which the refractive index and Abbe's number of the sample were measured using a precision refractometer (KPR-200, available from Kalnew Optical Industrial Co., Ltd.). The refractive index was measured at a wavelength of 587.6 nm (d-line), and the Abbe's number was calculated using the following equation (1) from refractive indices measured at wavelengths of 486.1 nm (F-line), 587.6 nm (d-line), and 656.3 nm (C-line).

$$\nu d = (nd - 1)/(nF - nC) \qquad \text{Equation (1):}$$

In the equation (1), νd denotes the Abbe's number, nF denotes the refractive index at a wavelength of 486.1 nm, nd denotes the refractive index at a wavelength of 587.6 nm, and nC denotes the refractive index at a wavelength of 656.3 nm.

(6) Production of Disc-Shaped Press-Molded Body (Diameter: 40 mm, Thickness: 3 mm)

6.0 to 6.5 g of the resin was placed on a mold and subjected to pressing at a pressure of 100 kgf/cm² for 2 minutes using a press molding machine set at a temperature 40 to 50° C. above the glass transition temperature of the resin (only in Comparative Example 2, the set temperature was a temperature 100° C. above the melting point of the resin). After a given period of time, the mold was quickly transferred to a cooling press molding machine in which cooling water was made to flow, and pressing was performed at a pressure of 100 kgf/cm² for 2 minutes. After a given period of time, the mold was taken out of the cooling press molding machine, and a press-molded body was obtained.

(7) Photoelastic Coefficient

A 1 cm×5 cm test piece was cut out from a film as produced by the method described below, and this test piece was used as a measurement sample. An ellipsometer (available from JASCO Corporation, product name: M220) was used to measure birefringence at a wavelength of 632.8 nm with respect to the change in load, and the photoelastic coefficient was calculated from the measurement result.

(8) Production of Films for Photoelastic Coefficient Measurement

Examples 1 to 5 and Comparative Example 4

Films with a thickness of about 100 μm were produced by solution casting. Specifically, the resin was dissolved in dichloromethane to a concentration of 5 wt %, the resin solution was poured onto a mold which was confirmed to be horizontally positioned, and then dichloromethane was gradually evaporated to form a film on the mold. The obtained optical film was separated from the mold and then thoroughly dried using a dryer at a temperature 20° C. below the glass transition temperature.

Comparative Examples 1 to 3 and Comparative Example 5

Films with a thickness of 150 to 250 μm were produced by hot press molding. Specifically, 3 g of the resin was placed on a mold and subjected to pressing at a pressure of 50 to 100 kgf/cm² for 2 minutes using a press molding machine set at a temperature 120 to 140° C. above the glass transition temperature of the resin (only in Comparative Example 2, the set temperature was a temperature 100° C. above the melting point of the resin) After a given period of time, the mold was quickly transferred to a cooling press molding machine in which cooling water was made to flow, and pressing was performed at a pressure of 100 kgf/cm² for 2 minutes. After a given period of time, the mold was taken out of the cooling press molding machine, and a film was obtained.

The obtained film was annealed using a dryer at a temperature 20° C. below the glass transition temperature for 10 hours.

When film production by solution casting was impossible because of occurrence of blushing during film formation, poor release from the mold, or insufficient solubility in the solvent, films were produced by hot press molding.

Monomer Synthesis Example

A 500 mL stainless steel reaction vessel was charged with 173 g (2.01 mol) of methyl acrylate and 167 g (1.26 mol) of dicyclopentadiene, which were reacted at 195° C. for 2 hours. The reaction gave a reaction liquid containing 96 g of the monoolefin of the following formula (4a). This liquid was subjected to purification by distillation, and a portion of the purified product was used for the subsequent reaction.

A 300 mL stainless steel reaction vessel was used to allow the distillation-purified monoolefin of the formula (4a) to undergo hydroformylation reaction using a $CO/H_2$ mixed gas ($CO/H_2$ molar ratio=1). Specifically, the reaction vessel was charged with 70 g of the monoolefin of the formula (4a), 140 g of toluene, 0.50 g of triphenyl phosphite, and 550 μL of a separately prepared toluene solution of Rh(acac)(CO)$_2$ (concentration: 0.003 mol/L). After three cycles of purging with nitrogen and three cycles of purging with the $CO/H_2$ mixed gas, the inside of the system was pressurized with the CO/H$_2$ mixed gas, and the reaction was allowed to proceed at 100° C. and 2 MPa for 5 hours. After completion of the reaction, the reaction liquid was analyzed by gas chromatography to confirm that this reaction liquid contained 76 g of the compound of the formula (3a) and 1.4 g of the monoolefin of the formula (4a) (conversion: 98%, selectivity: 97%). The reaction liquid was subjected to purification by distillation, and a portion of the purified product was used for the subsequent reaction.

A 300 mL stainless steel reaction vessel was charged with 54 g of the distillation-purified compound of the formula (3a), 7 mL of a sponge cobalt catalyst (R-400, available from Nikko Rica Corporation), and 109 g of toluene, then the inside of the system was pressurized with hydrogen gas, and the reaction was allowed to proceed at 3 MPa and 100° C. for 9 hours. After the reaction, the resulting slurry was filtered through a membrane filter having a pore size of 0.2 μm to remove the catalyst. After that, the solvent was distilled off using an evaporator, and the resulting product was analyzed by gas chromatography and GC-MS to confirm that the product contained 51 g of the main reaction product of the formula (2a) which had a molecular weight of 250 (main reaction product yield: 93%). Purification by distillation was further conducted to obtain the main reaction product (D-NHEs).

<Identification of Reaction Product>

Figure 1:
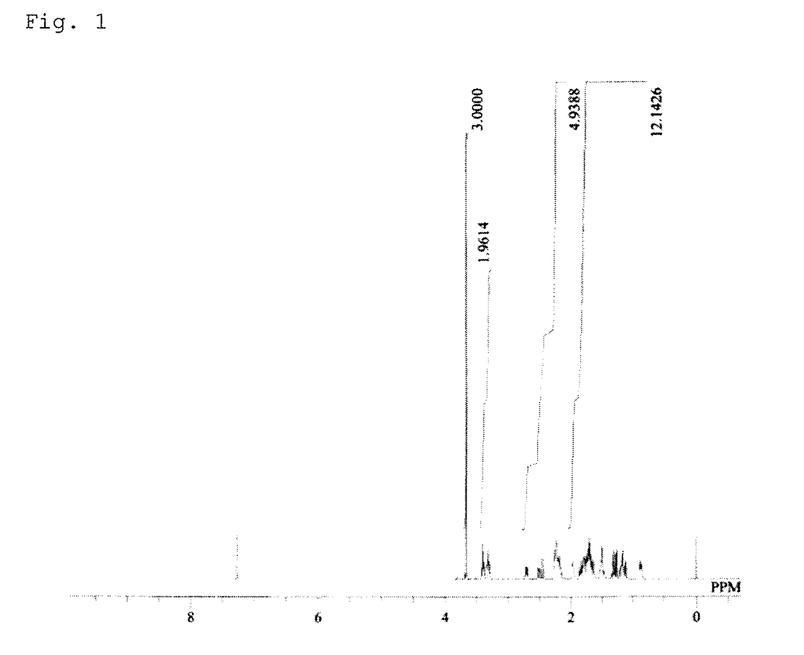
FIG. 1 shows a result of $^1$H-NMR measurement of a main reaction product obtained in a monomer synthesis example.
Figure 2:
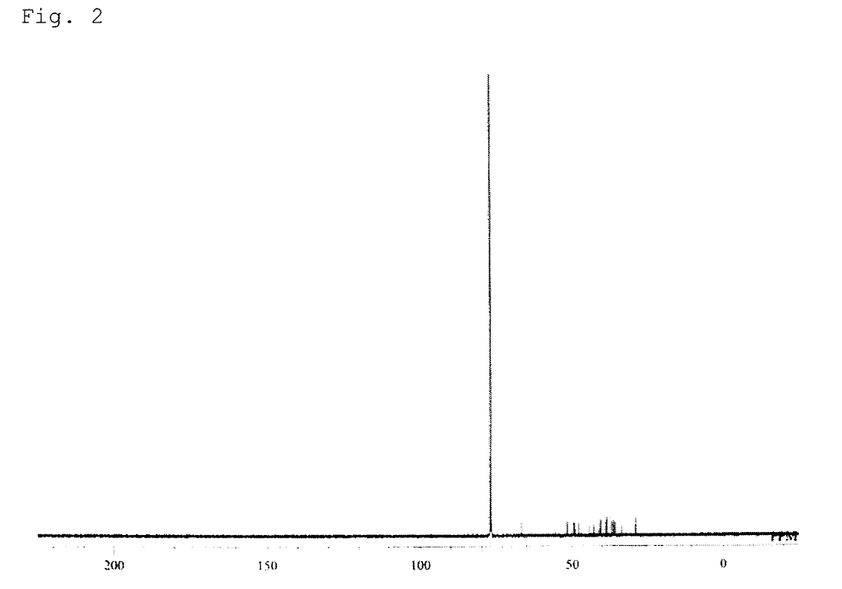
FIG. 2 shows a result of $^{13}$C-NMR measurement of the main reaction product obtained in the monomer synthesis example.
Figure 3:
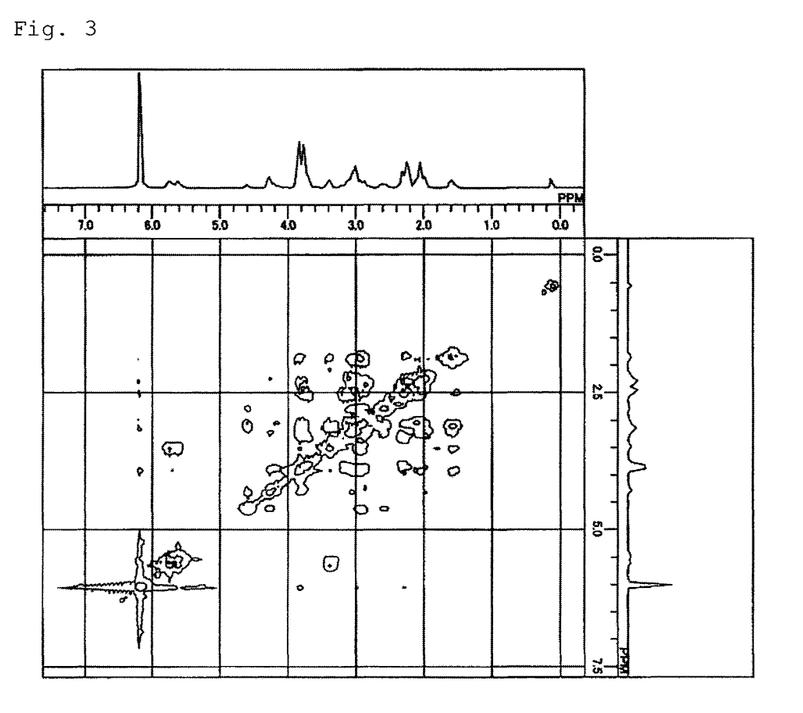
FIG. 3 shows a result of COSY-NMR measurement of the main reaction product obtained in the monomer synthesis example.

The components obtained in the monomer synthesis example were analyzed by NMR. The NMR spectra are shown in FIGS. 1 to 3. The result of GC-MS analysis specified below and the NMR analysis results shown in FIGS. 1 to 3 confirmed that the main reaction product obtained in the monomer synthesis example was the compound of the formula (2a).

<Analysis Method>

1) Conditions of Gas Chromatography Measurement

Analyzer: Capillary gas chromatograph GC-2010 Plus, available from Shimadzu Corporation Analysis column: InertCap1 (30 m, 0.32 mm I.D., thickness: 0.25 μm), available from GL Sciences Inc.

Oven temperature: 60° C. (0.5 minutes)–15° C./min–280° C. (4 minutes)

Detector: FID, temperature: 280° C.

2) Conditions of GC-MS Measurement

Analyzer: GCMS-QP2010 Plus, available from Shimadzu Corporation

Ionization voltage: 70 eV

Analysis column: DB-1 (30 m, 0.32 mm I.D., thickness: 1.00 μm), available from Agilent Technologies Oven temperature: 60° C. (0.5 minutes)–15° C./min–280° C. (4 minutes)

3) Conditions of NMR Measurement

Apparatus: JNM-ECA500 (500 MHz), available from JEOL Ltd.

Measurement mode: $^1$H-NMR, $^{13}$C-NMR, and COSY-NMR

Solvent: CDCl$_3$ (deuterated chloroform)

Internal standard: Tetramethylsilane

[Synthesis of Polyester Resins]

Examples 1 to 5

A small-sized polyester production apparatus equipped with a stirrer, a heater, a nitrogen inlet tube, and a cold trap was charged with starting monomers and titanium(IV) tetrabutoxide in amounts shown in Table 1. Under a nitrogen atmosphere, the mixture was heated to 240 to 250° C. and stirred. After holding at the raised temperature for 5 hours or more, the temperature was gradually raised in conjunction with gradual pressure reduction. Finally, the temperature was held at 260 to 270° C. while the pressure was held at 0.1 kPa or lower. Once an appropriate melt viscosity was reached, nitrogen was blown into the apparatus to obtain ordinary pressure, and the polyester resin formed was collected.

The results of evaluation of the polyester resin are shown in Table 1.

Comparative Example 1

A polyester production apparatus equipped with a stirrer, a heater, a nitrogen inlet tube, a partial condenser, a total condenser, and a cold trap was charged with starting monomers and tin(II) octylate in amounts shown in Table 1. Under a nitrogen atmosphere, the mixture was heated to 240 to 250° C. and stirred. After holding at the raised temperature for 5 hours or more, the temperature was gradually raised in conjunction with gradual pressure reduction. Finally, the temperature was held at 260 to 270° C. while the pressure was held at 0.1 kPa or lower. Once an appropriate melt viscosity was reached, nitrogen was blown into the apparatus to obtain ordinary pressure, and the polyester resin formed was collected.

The results of evaluation of the polyester resin are shown in Table 1.

Comparative Examples 2 to 5

In Comparative Examples 2 to 5, the following commercially-available products were purchased and evaluated.

Comparative Example 2: UNIPET (registered trademark) RT-553C (available from Japan Unipet Co., Ltd.)

Comparative Example 3: Eastar (registered trademark) 5011 (available from Eastman Chemical Company)

Comparative Example 4: ACRYPET (registered trademark) VH000 (available from Mitsubishi Chemical Corporation)

Comparative Example 5: Iupilon (registered trademark) S-2000 (available from Mitsubishi Engineering-Plastics Corporation)

TABLE 1

| | | | Example 1 | Example 2 | Example 3 | Example 4 | Example 5 | Comparative Example 1 |
|---|---|---|---|---|---|---|---|---|
| Synthesis of polyester resins | | | | | | | | |
| Amounts of monomers used [g] | Hydroxycarboxylic acid ester | D-NHEs | 11.47 | 9.53 | 7.84 | 7.34 | 1.83 | 0 |
| | Diester | DMCD | 0 | 1.20 | 1.10 | 1.96 | 2.93 | 32.14 |
| | | DMT | 0 | 0 | 0 | 0 | 0 | 0 |
| | Diol | CHDM | 0 | 0.88 | 0 | 0 | 0 | 34.72 |
| | | EG | 0 | 0 | 0 | 0.71 | 0 | 0 |
| | | BPEF | 0 | 0 | 2.55 | 1.93 | 6.53 | 0 |
| Amounts of catalysts used | Titanium(IV) tetrabutoxide | | 7.11 | 4.99 | 4.99 | 4.99 | 4.98 | 0 |
| | Tin(II) octylate | | 0 | 0 | 0 | 0 | 0 | 26.01 |
| Evaluation results | | | | | | | | |
| Copolymerization composition [mol %] | Hydroxycarboxylic acid unit = Unit (A) | D-NHEs | 100 | 76 | 74 | 59 | 20 | 0 |
| | Dicarboxylic acid unit = Unit (C) | DMCD | 0 | 12 | 13 | 20.5 | 40 | 50 |
| | | DMT | 0 | 0 | 0 | 0 | 0 | 0 |
| | Diol unit = Unit (B) | CHDM | 0 | 12 | 0 | 0 | 0 | 50 |
| | | EG | 0 | 0 | 0 | 11.5 | 0 | 0 |
| | | BPEF | 0 | 0 | 13 | 9 | 40 | 0 |
| Glass transition temperature (Tg) [° C.] | | | 175 | 150 | 159 | 140 | 140 | 55 |
| Amount of heat generated at cooling crystallization ($\Delta Hc$) [J/g] | | | 0 | 0 | 0 | 0 | 0 | 0 |
| Water absorption percentage (24-h immersion in water) [%] | | | 0.15 | 0.13 | 0.14 | 0.15 | 0.16 | 0.21 |
| Refractive index (nd) | | | 1.54 | 1.53 | 1.56 | 1.56 | 1.60 | 1.51 |
| Abbe's number (vd) | | | 56 | 56 | 40 | 42 | 28 | 56 |
| Photoelastic coefficient ($\varepsilon$) [$\times 10^{-12}$ $Pa^{-1}$] | | | −0.4 | 5 | 18 | 12 | 27 | 47 |

| | | | Comparative Example 2 | Comparative Example 3 | Comparative Example 4 | Comparative Example 5 |
|---|---|---|---|---|---|---|
| Synthesis of polyester resins | | | | | | |
| Amounts of monomers used [g] | Hydroxycarboxylic acid ester | D-NHEs | Commercially-available product was purchased | Commercially-available product was purchased | Commercially-available product was purchased | Commercially-available product was purchased |
| | Diester | DMCD | | | | |
| | | DMT | | | | |
| | Diol | CHDM | | | | |
| | | EG | | | | |
| | | BPEF | | | | |
| Amounts of catalysts used | Titanium(IV) tetrabutoxide | | | | | |
| | Tin(II) octylate | | | | | |
| Evaluation results | | | | | | |
| Copolymerization composition [mol %] | Hydroxycarboxylic acid unit = Unit (A) | D-NHEs | 0 | 0 | PMMA | BPA-PC |
| | Dicarboxylic acid unit = Unit (C) | DMCD | 0 | 0 | | |
| | | DMT | 50 | 50 | | |
| | Diol unit = Unit (B) | CHDM | 0 | 16 | | |
| | | EG | 50 | 34 | | |
| | | BPEF | 0 | 0 | | |
| Glass transition temperature (Tg) [° C.] | | | 81 | 81 | 116 | 153 |
| Amount of heat generated at cooling crystallization ($\Delta Hc$) [J/g] | | | >5 | 0 | 0 | 0 |
| Water absorption percentage (24-h immersion in water) [%] | | | *1 | 0.14 | 0.28 | 0.18 |
| Refractive index (nd) | | | *1 | 1.57 | 1.49 | 1.59 |
| Abbe's number (vd) | | | *1 | 29 | 58 | 30 |
| Photoelastic coefficient ($\varepsilon$) [$\times 10^{-12}$ $Pa^{-1}$] | | | *2 | 123 | −5 | 80 |

*1 Measurement was not conducted because of blushing of the press-molded body.
*2 Measurement was not conducted because of a failure to obtain a film with good transparency.

The abbreviations in the table are defined as follows.

D-NHEs: Decahydro-1,4:5,8-dimethanonaphthalene-2-methoxycarbonyl-6(7)-methanol

DMCD: Dimethyl 1,4-cyclohexanedicarboxylate (cis form/trans form=7/3)

DMT: Dimethyl terephthalate

CHDM: 1,4-cyclohexanedimethanol (cis form/trans form=3/7)

EG: Ethylene glycol

BPEF: 9,9-Bis(4-(2-hydroxyethoxy)phenyl)fluorene (also referred to as "bisphenoxyethanolfluorene")

PMMA: Polymethyl methacrylate

BPA-PC: Bisphenol A-based polycarbonate resin

The present application is based on the Japanese patent application (Japanese Patent Application No. 2016-190229) filed on Sep. 28, 2016, and the contents of the Japanese patent application are incorporated herein by reference.

INDUSTRIAL APPLICABILITY

The optical lens of the present invention has low water-absorbing capacity and is superior in heat resistance, transparency, and optical characteristics (refractive index, Abbe's number, and photoelastic coefficient). Therefore, the optical lens of the present invention can be suitably used in applications where glass lenses have conventionally been employed, such as in cameras, telescopes, binocular telescopes, and television projectors, and is significantly useful. The optical lens of the present invention can be used also as an aspherical lens. Further, a combination of the optical lens with other optical lenses enables establishment of various optical systems.

The invention claimed is:

1. An optical lens comprising a polyester resin comprising a structural unit (A) of the following formula (1) wherein the content of the structural unit (A) based on the total structural units of the polyester resin is 76 mol % or greater:

(1)

wherein
$R_1$ is a hydrogen atom, $CH_3$, or $C_2H_5$,
$R_2$ and $R_3$ is each independently a hydrogen atom or $CH_3$, and
n is 1.

2. The optical lens according to claim 1, wherein, in the formula (1), $R_1$, $R_2$, and $R_3$ are hydrogen atoms.

3. The optical lens according to claim 1, wherein the polyester resin satisfies at least one of the following conditions (1) to (6):
(1) a glass transition temperature of the polyester resin is 120° C. or higher;
(2) an amount of heat generated by the polyester resin at cooling crystallization is 5 J/g or less;
(3) a water absorption percentage after immersion in water for 24 hours of the polyester resin is 0.25% or less;
(4) an absolute value of photoelastic coefficient of the polyester resin is $40 \times 10^{-12}$ $Pa^{-1}$ or less;
(5) a refractive index (nd) for d-line wavelength light of the polyester resin is 1.60 or less; and
(6) an Abbe's number (νd) of the polyester resin is 28 or more.

4. The optical lens according to claim 1, wherein the optical lens is an aspherical lens.

5. A camera comprising the optical lens according to claim 1.

6. An optical system comprising a combination of the optical lens according to claim 1 and a different optical lens.

* * * * *